Feb. 4, 1969     T. J. GORDON     3,425,760
WHEEL ASSEMBLY
Filed July 20, 1966
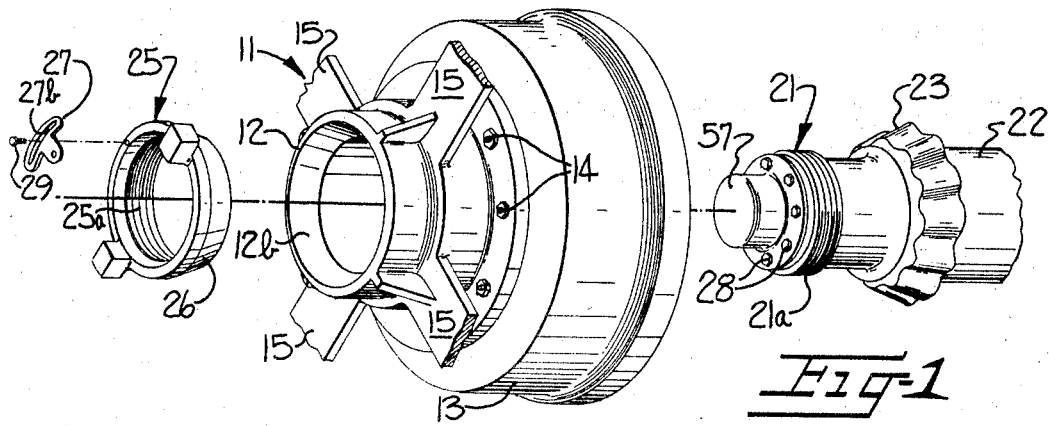
Fig-1
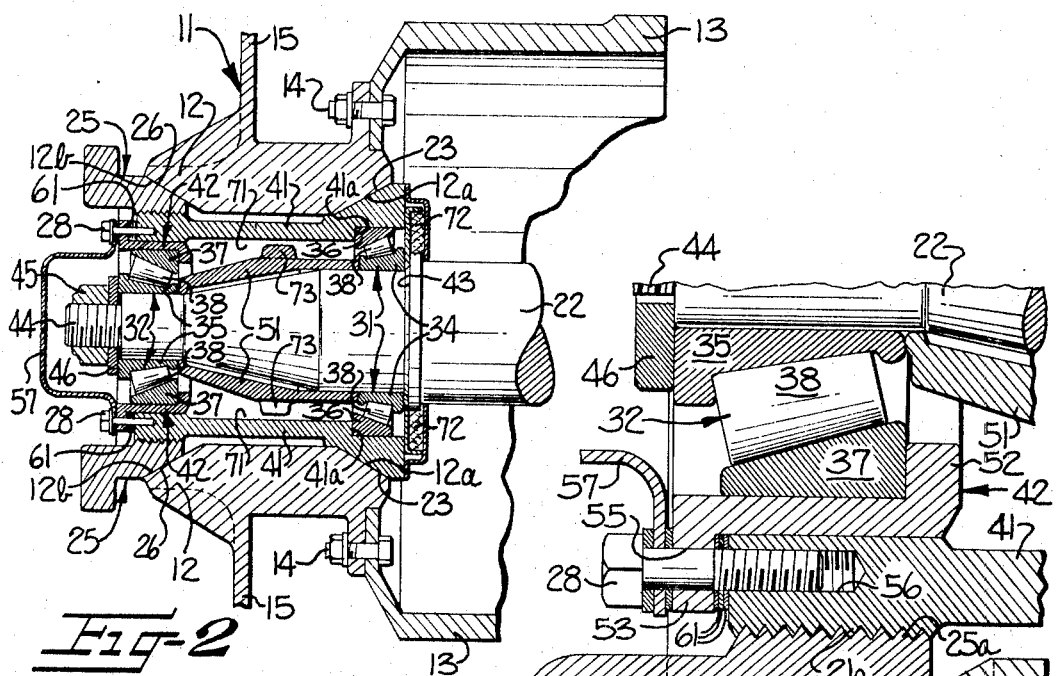
Fig-2
Fig-3
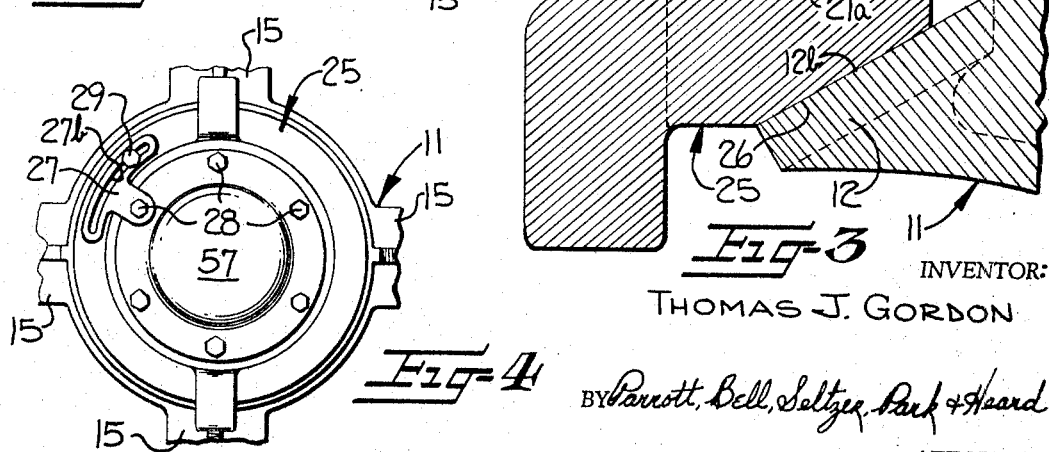
Fig-4
INVENTOR:
THOMAS J. GORDON
BY Parrott, Bell, Seltzer, Park & Heard
ATTORNEYS

United States Patent Office 3,425,760
Patented Feb. 4, 1969

3,425,760
WHEEL ASSEMBLY
Thomas J. Gordon, Decatur, Ga., assignor to Transport Engineering, Inc., Charlotte, N.C., a corporation of North Carolina
Filed July 20, 1966, Ser. No. 566,598
U.S. Cl. 308—207
Int. Cl. F16c *13/00, 33/00, 35/00*
11 Claims

ABSTRACT OF THE DISCLOSURE

A wheel assembly mounted for rotation on an end portion of an axle comprising inboard and outboard antifrictional radial and axial thrust bearings engaging the axle and surrounded by a housing, means carried by the housing for varying the preload on the bearings, and a wheel mounted on the housing for rotation therewith and being removable therefrom without disturbing the bearings and the preload existing thereon.

---

This invention relates to a rotatable wheel assembly and more particularly to an improved wheel assembly having means for preloading the antifriction load-bearing members thereof while permitting the removal of the wheel and brake drum of the assembly from their supporting axle without disturbing the preload of the bearing members.

In fixed axle mounted wheel assemblies having bearing members adapted to compensate for both radial and axial thrust during rotation, a preload pressure generally is applied to the bearings when they are placed in position on the axle. The influence of a preload aids to properly seat the bearings, prevent excess wear, and eliminate undesired axial movement in the wheel during rotation. When such wheel assemblies are removed from their support axles for maintenance and repair, generally the bearings members are displaced and require resetting, or preloading, upon replacement of the wheel and brake drum.

It is an object of the present invention to provide an improved wheel assembly of the type having radial and axial thrust bearing members which has means provided for accurately preloading the bearing members of the assembly and which is designed to permit the removal and replacement of the wheel without disturbing the bearing members or the preload existing thereon.

It is another object of this invention to provide an improved wheel assembly wherein the wheel and brake drum of the assembly can be removed simultaneously for repair and maintenance.

It is a further object of this invention to provide improved means for preloading bearing members of a wheel assembly which means fixes the axial position of the inner races of the bearings along the supporting axle while permitting adjustment of the axial distance between the outer races of the bearings to vary the preload pressure thereon.

An additional object of the present invention is to provide means to facilitate the lubrication of the bearing members of the wheel assembly.

Some of the objects of the invention having been stated, other objects will appear as the description proceeds, when taken in connection with the accompanying drawings, in which—

FIGURE 1 is an exploded, perspective view, with parts broken away, of the wheel assembly of the present invention showing the manner in which the assembly is secured to the end portion of a supporting axle;

FIGURE 2 is a cross-sectional view, with parts broken away, of the wheel assembly of FIGURE 1 showing the wheel and brake drum affixed to the end of the support axle;

FIGURE 3 is an enlarged view, with parts broken away, of a part of the cross-sectional view seen in FIGURE 2; and FIGURE 4 is an elevation view, with parts broken away, of the hub portion of the wheel assembly.

Referring more specifically to the drawings, FIGURE 1 shows a wheel assembly including a wheel, generally indicated at 11, having a hub portion 12, and a brake drum 13 affixed to the hub by a plurality of bolts 14. The wheel 11 has a plurality of spokes 15 which extend radially outwardly from the hub 12 and support an annular tire-receiving rim (not shown).

A bearing unit, generally indicated at 21, is affixed to the outboard end of an axle 22 and is adapted to supportingly receive the hub 12 of the wheel thereon. A beveled surface 23 on the bearing unit abuttingly engages a correspondingly beveled surface 12a located inboard on the hub (FIGURE 2). The beveled portions are appropriately splined to ensure the transmission of rotary movement from the wheel to the bearing unit. The wheel 11 and brake drum 13 are secured on the bearing unit 21 by a locking ring 25 which is internally threaded at 25a and rotatably engages an externally threaded portion 21a on the outboard end of the bearing unit. The hub 12 also has a beveled outboard surface 12b which is engaged by a corresponding beveled portion 26 of the locking ring 25 to properly seat and maintain the wheel against the bearing unit during rotation. The locking ring is provided with a safety bracket 27 (FIGURE 4) which prevents the ring becoming loose due to rotation of the wheel assembly. One end of the bracket is secured to the bearing unit 21 by one of a number of bolts 28 and the other end has an adjustable slot 27b which is positionally secured to the ring by a bolt 29.

The bearing unit 21 includes inboard and outboard tapered roller bearings 31 and 32 which have respective inner races 34, 35 engaging the peripheral surface of the axle 22 and respective outer races 36 and 37 spaced from the inner races by a plurality of rotatable, tapered rollers 38. The bearings are so arranged that the smaller ends of the rollers of each bearing are directed generally towards the other bearing.

A housing 41 surrounds the bearings and has a shoulder portion 41a thereon which engages the outboard side of the outer race 36 of the inboard bearing. An adjustable annular bracket 42, located at the outboard end of the housing, engages the outer race 37 of the outboard bearing and is manipulable to preload the bearings, as will be explained.

To maintain the axial position of the inner races of the bearings, axle 22 has an inboard shoulder 43 which abuts the inboard side of the inner race 34 of the inboard bearing to prevent its movement inwardly along the axle. The outer end of the axle 22 terminates in a threaded lug 44. A suitable locking means, shown as a nut 45, is rotatable thereon to maintain a washer 46 in abutting contact with the outboard side of the inner race 35 of the outboard bearing 32 and prevent its movement outwardly along the axle. To fix the distance between the respective inner races, a rigid spacer element 51, surrounding the axle 22, has its opposite ends abuttingly engaging the proximal sides of the inner races. The inner races 34 and 35 are thereby secured in fixed, axial position on the shaft 22.

To vary the axial distance between the outer races, adjustable bracket 42 has a radially inwardly and a radially outwardly extending flange 52 and 53. Flange 52 engages the inboard side of the outer race 37 of the outboard bearing and the flange 53 overlies the outboard end of housing 41. The bracket is secured to the housing by the plurality of bolts 28 which extend through spaced openings 55 in the flange 53 and threadedly engage internally threaded orifices 56 in the end of the housing. A plurality of shims 61 are selectively inserted between the outer end of the housing and the outwardly extending flange 53 of bracket 42. By varying the size and number of shims between the flange 53 and the end of the housing, the bracket 42 may be moved relative to the housing to change the distance between the outer races, the outer race of the inboard bearing being restrained from outboard movement along the axle by a shoulder portion 41a.

Due to the tapered configuration and arrangement of the rollers and outer races, movement of outer race 37 varies the axial force, and thus the resultant preload force, applied to the respective bearings 31 and 32.

As an additional feature of the bearing unit, housing 41 is radially spaced from the rigid spacer element 51 and provides an annular lubricating channel 71 for the respective bearings of the unit. Lubricant may be contained within the housing of the bearing unit by sealing gaskets 72 which surround the inboard shoulder 42 of the axle and by a cover plate 57 which closes the outboard end of the housing. The spacer element 51 also is tapered toward its outboard end and is provided with radial vanes 73 which agitate and aid in distributing the lubricant during rotation of the wheel about the axle 22.

With the present wheel assembly, the wheel and brake drum of the assembly can be removed from the bearing unit and axle without disturbing the preload condition of the bearing unit. Although the wheel assembly of the invention is disclosed as a freely rotating wheel secured to a fixed axle shaft, the wheel may be driven by appropriate drive means, if desired; and, although the bearings are represented as tapered roller bearings, other antifriction radial and axial thrust bearings may be substituted therefor without departing from the scope of the invention.

In the drawings and specification there has been set forth a preferred embodiment of the invention and, although specific terms are employed, they are used in a generic and descriptive sense only and not for purposes of limitation, the scope of the invention being defined in the claims.

I claim:

1. A wheel assembly mounted for rotation on an end portion of an axle, said wheel assembly comprising an inboard and an outboard antifriction radial and axial thrust bearing, each bearing having an inner and an outer race and rotatable means positioned between and engaging the inner faces of said races, the inner race of each bearing engaging the surface of the axle, means for maintaining the inner races of the bearings at fixed positions on said axle, a housing surrounding said bearings and engaging the outboard side of the outer race of the inboard bearing and controlling the position thereof, means carried by said housing and engaging the inboard side of the outer race of the outboard bearing for controlling the position thereof to vary the distance between the outer races along said axle to preload the bearings, a wheel having a hub portion surrounding said housing and engaging a portion of the outer surface thereof and being removable from said housing without disturbing the bearings and preload existing thereon, and means securing said hub portion of the wheel on said housing for rotation of the wheel with the housing.

2. A wheel assembly as defined in claim 1, wherein said means for maintaining the inner races at fixed positions on said axle includes a rigid spacer element surrounding said axle and having its opposite ends abuttingly engaging the proximal portions of the inner races of the respective bearings.

3. A wheel assembly as defined in claim 2, wherein said means for maintaining the inner races at fixed positions on said axle also includes an inboard shoulder portion on said axle and removable locking means at the outboard end of said axle, said shoulder portion and locking means abutting distal portions of the inner races of the respective inboard and outboard bearings.

4. A wheel assembly as defined in claim 1, wherein said rotatable means in each bearing includes tapered rollers with the rollers of each bearing positioned so as to taper generally toward the other bearing; and wherein said means for varying the axial distance between the outer races of said bearings includes a shoulder portion on said housing abutting the outer race of said inboard bearing to prevent its movement outwardly along said axle and a bracket having a radially inwardly extending and a radially outwardly extending flange, the inwardly extending flange engaging the inboard side of the outer race of the outboard bearing and the outwardly extending flange overlying the outboard end of the housing, shim means removably positioned between the outwardly extending flange and the outboard end of the housing to position the bracket axially with respect to the housing and thus position the outer races axially with respect to each other, and means securing the bracket to the housing.

5. A wheel assembly as defined in claim 2 wherein said housing is spaced radially outwardly from said rigid spacer element to provide an annular lubricating channel extending between said bearings, said spacer element being tapered toward the outboard end of said axle to facilitate the flow of lubricant between said inboard and outboard bearings, and at least one radial vane extending from said spacer element between said inboard and outboard bearings to agitate and distribute lubricant in said annular channel.

6. A wheel assembly as defined in claim 1, wherein the outer surface of said housing and the inner surface of said hub, over the portion of their engagement, are splined to facilitate transmission of rotation between said wheel and said bearings, and including a brake drum secured to said wheel for removal therewith from said housing and axle.

7. A wheel assembly as defined in claim 6, wherein said means securing the hub of the wheel on the housing for rotation therewith includes an internally threaded locking ring rotatably engaging a corresponding externally threaded portion on the outboard end of the housing, said locking ring having a beveled surface abuttingly engaging the outboard end of the hub to urge the hub and housing into positive engagement over their splined portions, and means for preventing relative rotation of said locking ring with respect to said housing during rotation of the wheel.

8. A wheel assembly mounted for rotation on an end portion of an axle, said wheel assembly comprising an inboard and an outboard antifriction bearing, each bearing having an inner and outer race having tapered inner surfaces and a plurality of tapered rollers rotatably positioned between and in contact with the respective races of the bearings, each of the bearings being arranged on said axle with the smaller ends of the rollers of each of the bearings directed generally towards the other bearing and the outer races of each bearing being axially movable along the surface of said rollers, the inner race of each bearing engaging the surface of the axle at fixed positions thereon, a housing surrounding said bearings and engaging the outer race of the inboard bearing to control its outboard movement, an adjustable bracket carried on the outboard end of said housing and having a portion thereof engaging the inboard side of the outer race of the outboard bearing, and means cooperating with said bracket to vary its position on said housing to control the axial distance between the outboard races and move them, relative to the tapered rollers and inboard races, to establish a preload on the bearings of the wheel assembly.

9. A wheel assembly mounted for rotation on an end portion of an axle, said wheel assembly comprising an inboard and an outboard antifriction radial and axial thrust bearing, each bearing having an inner and an outer race and rotatable means positioned between and engaging the inner faces of said races, the inner race of each bearing engaging the surface of the axle, means for maintaining the inner races of the bearings at fixed positions on said axle, a housing surrounding said bearings and engaging the outer race of the inboard bearing and controlling the position thereof, means carried by said housing and engaging the outer race of the outboard bearing for controlling the position thereof to vary the distance between the outer races along said axle to preload the bearings, a wheel having a hub portion surrounding said housing and engaging a portion of the outer surface thereof and being removable from said housing without disturbing the bearings and preload existing thereon, cover means carried by the housing and closing the outboard end thereof for retaining lubricant within the housing during removal of the wheel therefrom and means securing said hub portion of the wheel on said housing for rotation of the wheel with the housing.

10. A wheel assembly mounted for rotation on an end portion of an axle, said wheel assembly comprising an inboard and an outboard antifriction radial and axial thrust bearing, each bearing having an inner and an outer race and rotatable means positioned between and engaging the inner faces of said races, said rotatable means comprising tapered rollers with the rollers of each bearing positioned so as to taper generally toward the other bearing, the inner race of each bearing engaging the surface of the axle, means for maintaining the inner races of the bearings at fixed positions on said axle, a housing surrounding said bearings and engaging the outer face of the inboard bearing and controlling the position thereof, means carried by said housing and engaging the outer race of the outboard bearing for controlling the position thereof to vary the distance between the outer races along said axle to preload the bearings, a wheel having a hub portion surrounding said housing and engaging a portion of the outer surface thereof and being removable from said housing without disturbing the bearings and preload existing thereon, means securing said hub portion of the wheel on said housing for rotation of the wheel with the housing and wherein said means for varying the axial distance between the outer races of said bearings includes a shoulder portion on said housing abutting the outer race of said inboard bearing to prevent its movement outwardly along said axle and a bracket having a radially inwardly extending and a radially outwardly extending flange, the inwardly extending flange engaging the inboard side of the outer race of the outboard bearing and the outwardly extending flange overlying the outboard end of the housing shim means removably positioned between the outwardly extending flange and the outboard end of the housing to position the bracket axially with respect to the housing and thus position the outer races axially with respect to each other, and means securing the bracket to the housing.

11. A wheel assembly mounted for rotation on an end portion of an axle, said wheel assembly comprising an inboard and an outboard antifriction radial and axial thrust bearing, each bearing having an inner and an outer race and rotatable means positioned between and engaging the inner faces of said races, the inner race of each bearing engaging the surface of the axle, means including a rigid spacer element surrounding said axle and having its opposite ends abuttingly engaging the proximal portions of the inner races of the respective bearings for maintaining the inner races of the bearings at fixed positions on said axle, a housing surrounding said bearings and engaging the outer race of the inboard bearing and controlling the position thereof, said housing being spaced radially outwardly from said rigid spacer element to provide an annular lubricating channel extending between said bearings, said spacer element being tapered toward the outboard end of said axle to facilitate the flow of lubricant between said inboard and outboard bearings, and at least one radial vane extending from said spacer element between said inboard and outboard bearings to agitate and distribute lubricant in said annular channel, means carried by said housing and engaging the outer race of the outboard bearing for controlling the position thereof to vary the distance between the outer races along said axle to preload the bearings, a wheel having a hub portion surrounding said housing and engaging a portion of the outer surface thereof and being removable from said housing without disturbing the bearings and preload existing thereon, and means securing said hub portion of the wheel on said housing for rotation of the wheel with the housing.

References Cited

UNITED STATES PATENTS

| | | | |
|---|---|---|---|
| 1,671,682 | 5/1928 | Norris | 308—207.1 |
| 3,156,506 | 11/1964 | Scheifele et al. | 308—207.1 |

MARTIN P. SCHWADRON, *Primary Examiner.*

F. SUSKO, *Assistant Examiner.*